United States Patent Office 3,520,728
Patented July 14, 1970

3,520,728
ELECTRICAL ACCUMULATOR WITH A METAL HYDRIDE SERVING AS THE CATHODIC REACTIVE MATERIAL ARRANGED IN SUSPENSION IN THE ELECTROLYTE
Klaus-Dieter Beccu, Onex, Switzerland, assignor to Battelle Memorial Institute-International Division, Carouge, Geneva, Switzerland
Filed Feb. 5, 1968, Ser. No. 702,889
Claims priority, application Switzerland, Feb. 7, 1967, 1,898/67
Int. Cl. H01m *35/00, 47/00*
U.S. Cl. 136—6                                  8 Claims

ABSTRACT OF THE DISCLOSURE

An electrical energy storage cell comprising a cathode compartment and an anode compartment respectively containing a cathode and an anode. The cathodic reactive material is a suspension in the electrolyte of particles in the form of a metal hydride which is oxidized to form water during discharge, said particles being in contact with a cathodic current collector electrode. The cathode and anode compartments are separated by a porous inert wall which is permeable to the electrolyte while being impermeable to said reactive material particles.

---

The accumulators hitherto used industrially, such as the lead, nickel-cadmium, nickel-iron and silver-zinc accumulator all have in common that the current input and collecting functions of their electrode systems are coupled with the electrical energy storage function. This does in fact have the advantage of allowing easy handling of such electrode systems, particularly in the case of accumulators having a small capacity, as the active mass which is often a bad conductor is fixed in porous, inert supporting electrode structures which are good conductors and through which electrical energy is supplied to or collected from the active mass. The disadvantage of these electrodes lies, however, in their very small capacity per unit weight and volume of the electrode, due to the fact that only a small, limited portion of active substance can be fixed per unit volume of the electrode supporting structure. Furthermore, manufacturing such electrodes is quite onerous as the active mass must be incorporated in the porous electrode supporting structures by means of lengthy and costly methods. When a porous body of sintered nickel is used for nickel-cadmium accumulators, further manufacturing problems arise as the porous structures must not only have a free volume for receiving the active mass which is as high as possible, but must also have a suitable pore structure to allow unimpeded diffusion of the electrolyte and have sufficient mechanical resistance and electrical conductivity as well. That is why the specific capacities per unit weight and volume of the most efficient known accumulator systems (silver-zinc) attain only 10–30% of the theoretical energy densities, i.e. a maximum of 120 wh./kg. or 200 wh./l. In addition to the high cost of such accumulators with high energy density, their working life is limited.

In another known accumulator system a cathode consisting of a solid body of Raney nickel and an anode consisting of a solid silver electrode are used. When charging hydrogen is developed from the electrolyte at the cathode and oxygen is developed at the anode. Nickel hydride is thus formed on the cathode side and silver oxide on the anode side. When discharging, the inverse process occurs: nickel hydride and silver oxide are transformed into nickel and silver while forming water and giving off electrical energy. The degree to which Raney nickel in form of a solid electrode body may be charged with hydrogen is, however, very slight. In addition, the nickel hydride which is formed is stable only during a short period. Furthermore, the capacity of Raney nickel for absorbing hydrogen diminishes continuously as a function of the number of charges effected so that the capacity of the accumulator also diminishes.

For the reasons given above, most known accumulator systems are substantially unsuitable for use as a source of energy for arrangements having high energy requirements, e.g. for the electrical propulsion of vehicles.

In other known electrochemical energy storage systems, the attempt has been made to avoid, at least partially, the disadvantages of the arrangements described above by using, instead of supporting structures with a fixed active mass, electrodes having an active mass which dissolves in the electrolyte during the discharging operation and which is stored separately after precipitation out of the electrolyte. When charging, the precipitated active mass is then dissolved once more and precipitated on the inert electrode supporting structure. While such systems have a high energy storage capacity per unit weight and volume and are inexpensive due to the possibility of using cheap materials, they have the disadvantages of requiring the use of additional equipment for separating the dissolved active mass, while the reprecipitation takes places with a low efficiency and provides an active mass which is only partially active.

In other known accumulator systems, the chemical storage of energy takes place in solutions which are saturated with substances which undergo a valence change whilst in contact with inert electrodes during the charging and discharging operations. In this case, however, the amounts of energy which can be stored per unit weight and volume are quite small as the solubility of the chemical compounds which may be used and the efficiency of the discharge are quite low.

It is further known, in the field of fuel cells, to use Raney nickel, in suspension in an electrolyte, as a catalyst for activating molecular hydrogen. For this purpose, gaseous hydrogen is injected into a Raney nickel suspension which is made to circulate so as to be brought into contact with suitable current collector electrodes. The hydrogen which has been catalytically activated by the Raney nickel is oxidized to form water when the Raney nickel particles impinge upon the current collector electrodes which are connected by means of an external load resistance to an oxygen electrode. However, this process of catalytic activation provides either no storage of hydrogen at all or, at best, only an insignificant accumulation of hydrogen, during a short period, at the surface of the particles, so that the use of such a suspension does not allow any electrical storage capacities worth mentioning to be realised and thus does not come into consideration for accumulators.

The object of the invention is to provide an electrical energy storage cell in which the above mentioned disadvantages of known accumulators are avoided.

The present invention relates to an electrical energy storage cell comprising a cathode compartment and an anode compartment, an electrolyte in said compartments, a cathode and an anode immersed in said electrolyte, cathodic reactive material as a suspension in the electrolyte and being of particles in the form of a metal hydride which is oxidized to form water during discharge, a cathodic current collector electrode, said particles being in contact with said cathodic current collector electrode, and a porous separating wall, said cathode and anode compartments being separated by said porous separating wall which is permeable to the electrolyte while being impermeable to said reactive material particles and is inert to the electrolyte and to oxidizing and reducing agents.

The use of a cathodic suspension according to the invention provides a completely reversible energy storage system which can be charged as often as desired. As no damage occurs in the suspension, even when the system is overloaded, the working life of the suspension is practically unlimited. The separation of the current collecting function from the storage function which the present invention provides further allows any desired amount reactive material to be utilised electrochemically while having relatively small dimensions of the current collector electrodes. Furthermore, since the suspension may have a high density, considerable capacities may be obtained per unit weight and volume. As a suspension may be here considered any physical distribution, in the electrolyte, of particles having any desired size and geometric form. The density of the suspension may in some cases be approximately equal to the density of the heaped particles, the space remaining between the particles then being filled with electrolyte. On the other hand, the suspension may also have a density which is nearly equal to that of the electrolyte due to the presence of only a small number of particles per unit volume of the electrolyte. The density of the suspension which is used depends upon the type of cell used and the particle mass, as well as upon the intended method of charging and discharging. Suspensions having low densities require high relative velocities of the particles with reference to the current collector electrodes and a better surface conductivity of the particles for the charge transfer, than is the case with slurries having high density.

The specific storage capacities which may be attained with metal hydride powder suspensions may be higher than 200 w.h./kg. As compared to the conventional systems with a fixed, incorporated active mass, any desired amount of active mass may be utilized in the storage cell according to the invention and the mass in suspension may, if necessary, be brought into intimate contact with the charging and discharging electrodes by stirring or pumping so as to allow the electron transfer necessary for the charging and discharging operations to proceed without great transfer resistance. As the suspensions may be transported in the same way as liquids, the cells can be very rapidly recharged by replacing the discharged suspensions by charged suspensions.

As electrolyte an alkaline electrolyte may preferably be used in the present invention; in some cases, however, an acidic or a neutral electrolyte may also be utilized. Furthermore, the porous separating wall must consist of a material which is resistant to the system used, i.e. to the electrolyte and the reactive materials. Thus, for example, this material must be resistant to oxidation, the choice of material being particularly important when using as cathodic reactive material silver oxides which are known to be very strong oxidizing agents. For the systems described below, the use of a porous polyolefine membrane seems advisable.

The reactive materials in suspension and the electrolyte must in each case be selected so that they do not dissolve in the electrolyte and do not corrode. It is furthermore required that the electronic conductivity of the particles used should not vary substantially when the hydride and oxide formation occurs, since the electronic conductivity assures, among other things, a good charge transfer, i.e. a higher charging and discharging efficiency.

As reactive material for the cathodic suspension, metallic hydrides of the following metals, or alloys thereof, are particularly suitable: palladium, thorium, iron, cobalt, nickel, titanium, zirconium, vanadium and cerium. Among these metals, nickel and titanium offer certain advantages for the cathodic suspension as they are not only inexpensive but also provide a high hydrogen storage capacity per unit weight of metal. Theoretically, the greatest amount of hydrogen which may be taken up by nickel is attained with $NiH_2$. Such a nickel hydride may, however, only be prepared under certain conditions and is very unstable.

In case of the titanium hydride, on the other hand, the theoretical storage capacity of two hydrogen atoms per titanium atom may be obtained when the hydrogenation takes place in the gas phase at a temperature above 200° C. The electrochemical hydrogenation of unalloyed titanium by cathodic charging leads easily to the irreversible formation of titanium oxides. This disadvantage may be avoided by using alloys of titanium, for example, with nickel or other metals of the electrochemical series which are more noble than titanium. These alloys, which may also contain ternary and quaternary components, e.g. by additions of Pd, Pt, Cu, Ag, V, Zn or Al to the titanium-nickel alloys, have, in addition to the role of improving the resistance of titanium to corrosion in the electrolyte, that of favoring the capacity of hydrogen transfer to the titanium or the titanium alloy.

Alloys rich in titanium, i.e. such as contain 60–95% titanium by weight, are particularly suitable for storing hydrogen in hydride form. By contrast, titanium-nickel alloys have been proposed for the catalytic activation of hydrogen in fuel cells, which generally contain between 5 and 20% titanium by weight. Due to their unfavorable lattice structure and to their low titanium concentration, such alloys have hardly any ability of storing hydrogen.

The storage of hydrogen in a suspension of titanium-alloy particles in the form of a hydride allows the utilization of alloys which are very rich in titanium for the reactive material. The use of such alloys is, however, not possible in sintered solid electrodes due to the mechanical stresses which occur when charging and discharging. In fact, by the incorporation of hydrogen into the metal lattice, the latter is considerably enlarged, so that charging produces a dilatation and discharging a contraction, whereby considerable mechanical stresses are produced in the particles. A suitable choice of the sizes and shapes of the particles allows the danger of erosion in particles of alloys rich in titanium, due to the charging and discharging process, to be substantially eliminated.

A further advantage of cathodic suspensions of the above mentioned alloys lies in their good surface and bulk electronic conductivity, whereby the charge transfer to the current collector electrodes and between the particles occurs substantially without resistance. By applying certain measures such as a suitable choice of the velocity of flow of the particles against the current collector electrode or applying pressure in a slurry bed having a high suspension density, it is furthermore possible to reduce polarization and the internal resistance of the cell. In addition, the hydride formation may be favored by activating the hydrogen by choosing a suitable inert charging electrode having a high hydrogen overtension and consisting, for example, of cadmium or of an appropriate amalgam, e.g. tin amalgam.

The anodic reactive material may also be in suspension, metal powders being used which have the ability of taking up the oxygen developed at the inert anode to form metal-oxygen compounds and, when discharging, of giving off the oxygen to form the metal and water. Such metals are, for example, silver, manganese or mercury, or alloys thereof with other metals capable of absorbing oxygen. It is, however, silver which would preferably be used. Higher oxygen/silver ratios may further be obtained by doping the silver with cerium. However, any oxide electrode mass functioning in a reversible manner and having a sufficient electronic conductivity may be used for the positive suspension. For the anodic storage of oxygen, the activation of the oxygen by a suitable choice of an inert electrode material having a high oxygen overtension, such as silver or graphite, also plays an important role in the charging operation. For discharging, however, an inert electrode material is suitable on the anode side, which has a slight oxygen overtension, such as nickel.

Whether the combination of a cathodic suspension-electrode with an air or oxygen electrode is advantageous, or not, will depend, in each case, on the desired operating conditions of the storage cell. In some cases, e.g. when utilizing the cell for the propulsion of vehicles, the use and replacement of only one suspension, namely the cathodic suspension is advisable, while the anode consists of an oxygen or air electrode. If, on the other hand, charging and discharging of the suspension is to take place in the same cell, the use of an anodic as well as a cathodic suspension is indicated.

The accompanying drawings illustrate schematically three exemplary embodiments of an electrical energy storage cell according to the present invention.

Figure 1:
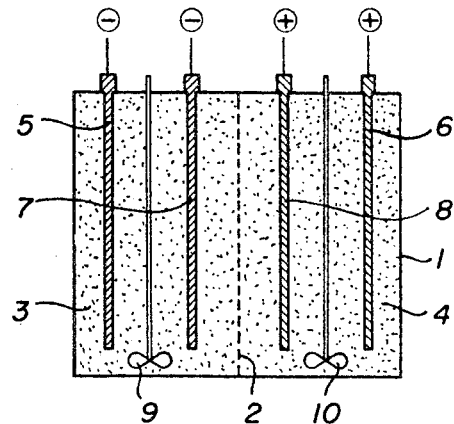
FIG. 1 shows a vertical cross-sectional view of a first embodiment.

As may be seen from FIG. 1, the cell 1 is subdivided by a porous, inert separating wall 2 into a cathode compartment 3 and an anode compartment 4. The cell 1, i.e. the compartments 3, 4 is filled with an aqueous potassium hydroxide solution which serves as electrolyte. In each of the compartments 3 and 4 is arranged a nickel current collector or discharge electrode 5 and 6 respectively. In the cathode compartment 3, the reactive material is a powder, in suspension in the electrolyte, composed of a hydride of an alloy having the following composition by weight: Ti (85%)—Ni (10%)—Cu (3%)—V (2%). In the anode compartment, on the other hand, the reactive material is of a silver oxide powder in suspension in the electrolyte. The diameter of the alloy hydride powder and silver particles is at most 50μ. Charge electrodes 7 and 8 made of cadmium and silver respectively are further arranged in the cathode compartment 3 and the anode compartment 4. Stirrers 9 and 10 are also arranged in the compartments 3 and 4 respectively for bringing the whole active mass consisting of alloy and silver particles continuously into contact with the respective electrodes 5, 7 and 6, 8. The separating wall 2 consists of a polyolefine membrane which is inert to the electrolyte and to silver oxide, this wall having a porous structure which renders it permeable to the electrolyte and impermeable to the alloy and silver particles.

The above described storage cell operates as follows:

For charging the cell, a potential difference is applied to the charge electrodes 7, 8 of cadmium and silver, which corresponds to the decomposition voltage of the electrolyte, with allowance for the overtension at the charging electrodes. During the charging operation, hydrogen is developed from the electrolyte at the charge electrode 7 and is directly absorbed by the alloy particles in suspension in the cathode compartment 3 to provide hydride formation. At the same time, oxygen is developed from the electrolyte at the charge electrode 8 and is absorbed by the silver particles in suspension in the anode compartment 4 so as to form a silver oxide therewith. The charging operation is terminated as soon as all alloy and silver particles have been brought into contact with the respective charge electrodes 7 and 8, by means of the stirrers 9 and 10, and have been transformed into the corresponding hydride and oxide.

The storage cell charged in this manner produces a potential difference between the discharge, i.e., collector electrodes 5, 6, so that electrical energy may be supplied to a utilizer by means of these electrodes. During the discharging operation, the hydride and oxide are once more transformed into alloy and silver, while forming water, and then are available once more for further charging.

Figures 2, 3:
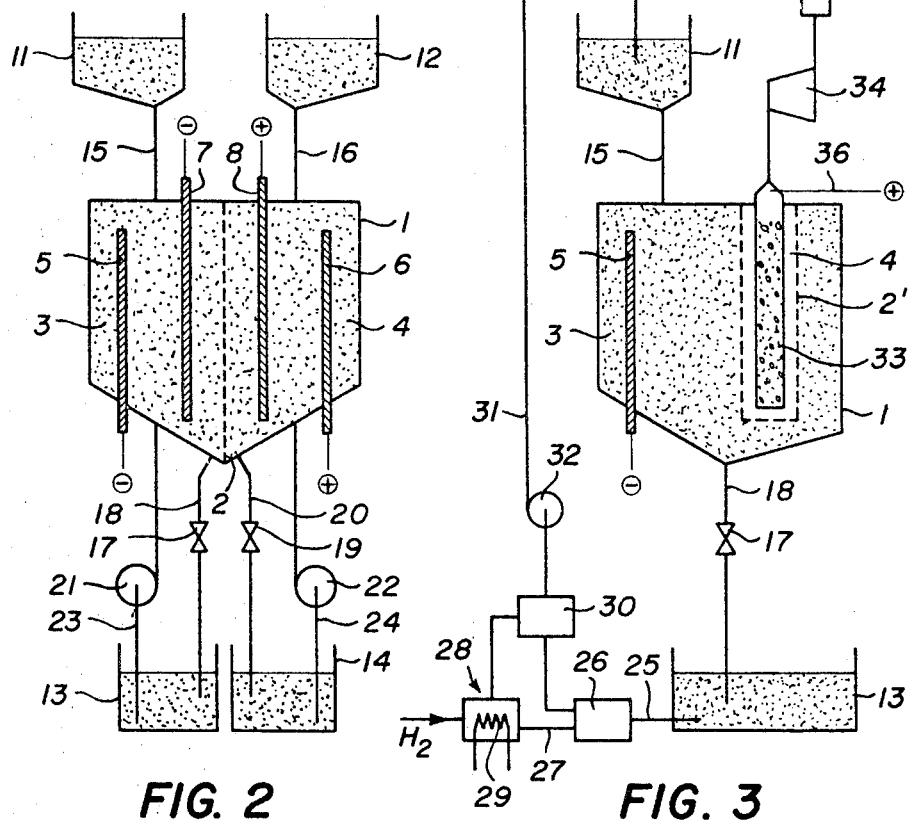
FIG. 2 shows a vertical cross-sectional view of a second embodiment.
FIG. 3 shows a vertical cross-sectional view of a third embodiment.

The second embodiment according to FIG. 2 differs essentially from the first embodiment described above in that additional containers 11, 12 and 13, 14 are respectively provided for the charged and the discharged particles. In this case, an alloy having the composition, by weight: Ti (74%)—Ni (20%)—Cu (4%) is used for the cathodic suspension. The average particle size lies between 0.5 and 3 mm. As shown in FIG. 2, the cathode compartment 3 is connected by a duct 15 to the upper container 11 for storing the cathodic hydride suspension, while the anode compartment 4 is connected by a duct 16 with the upper container 12 for storing the anodic oxide suspension. In addition, a duct 18 equipped with a valve 17 serves to evacuate the cathodic alloy suspension from the cathode compartment 3 to the lower container 13, while a duct 20 equipped with a valve 19 serves to evacuate the silver suspension from the anode compartment 4 to the lower compartment 14. The discharged alloy and silver suspensions return from the containers 13, 14 to the respective compartments 3, 4 by means of pumps 21, 22 arranged in ducts 23 and 24 respectively.

It may be readily seen that in this second embodiment, the use of the containers 11, 12 and 13, 14 allows a considerably larger amount of active mass to be available for storing energy.

This storage cell as shown in FIG. 2 operates as follows:

The charging and discharging operations take place in the compartments 3, 4 in the same manner as in the first embodiment, namely on one hand by means of the charge electrodes 7, 8 of cadmium and silver respectively and, on the other hand, by means of the discharge electrodes 5, 6 of nickel. Charging is carried out when the reserve of charged particles in the containers 11 and 12 is used up and the discharged suspensions are present in the containers 13 and 14. For charging, a suitable potential difference is applied, in the manner described above, to the charge electrodes 7 and 8 and the valves 17 and 19 are closed. The alloy and silver suspensions are respectively conveyed by the pumps 21 and 22 from the containers 13 and 14 to the cathode compartment 3 and the anode compartment 4, said suspensions being brought, while charging, into intimate contact with the charge electrodes 7 and 8 by guide means (not shown in FIG. 2). The alloy powder is thus converted into hydride and conveyed to the container 11 through the duct 15 while the silver powder is converted into a silver oxide and conveyed to the container 12 through the duct 16. When the charging operation is terminated, the pumps 21, 22 are stopped and the charged suspensions are now largely stored in the storage containers 11, 12 while also filling the compartments 3 and 4. The potential difference thus produced at the discharge electrodes 5, 6 allows electrical energy to be supplied by means of these electrodes to a utilizer.

When discharging, the valves 17 and 19 are opened so as to allow the discharged suspensions to flow off into the containers 13 and 14 and to be replaced by charged suspensions from the containers 11, 12. As the downwards movement of the suspensions is effected in the present case solely by the force of gravity, the flow rates of these suspensions through the compartments 3 and 4 should be adapted to the amount of current extracted from the storage cell in each case. For this purpose, the valves 17 and 19 are controlled as a function of the amount of current extracted by a control device which is not shown in FIG. 2.

As may be seen from FIG. 3, in the third embodiment the cell 1 is also subdivided by a porous separating wall 2' into a cathode compartment 3 and an anode compartment 4. The compartment 3 is provided with a discharge electrode 5, while a powder of an alloy having the same composition and particle size as in the second embodiment is in suspension in potassium hydroxide solution and serves as the cathodic active mass. Furthermore, a container 11 having an outlet duct 15, and a container 13 having a supply duct 18 equipped with a valve 17 are provided for storing, the charged and the discharged cathodic suspensions respectively. The discharged cathodic suspension stored in container 13 is evacuated through a duct 25 to a separator 26 in which the discharged alloy particles are separated from the electrolyte. These particles then pass through a duct 27 to a separate regenerating station 28 serving for hydride formation by treatment by means of molecular hydrogen provided by a suitable supply source (not shown). This treatment is carried out at a temperature of about 300 to 400° C. provided by an appropriate heating device 29 and at an absolute pressure of about 10 atmospheres provided by said hydrogen supply source. The hydride i.e. the charged alloy particles thus obtained pass from the regenerating station 28 to a mixer 30 in which they are once more put into suspension in the electrolyte and the charged suspension is then returned by a duct 31 equipped with a pump 32 to the supply container 11 for subsequent use in the cathode compartment 3. It may be noted that the regenerating station 28 together with the other elements associated therewith may be separated from the accumulator and may appropriately form a part of a central station which supplies several accumulators with charged hydride suspension.

On the anode side the third embodiment is provided with an air electrode of a well known type. This air electrode consists of a porous anode body 33 of silver activated with graphite, which is arranged in the anode compartment 4 and is immersed in the electrolyte, i.e. in the potassium hydroxide. This electrode is further equipped with an air compressor 34, a $CO_2$-filter 35 and a conductor 36 fixed to the anode body 33. The porous separating wall 2' consists of a cylindrical membrane which is closed at one end and encloses the electrode body 33. This membrane has a porous structure such as to render it permeable to potassium hydroxide, while being impermeable to the alloy powder in suspension in the cathode compartment 3, so as to keep this powder or the hydride from penetrating into the anode compartment 4.

When discharging, air purified of $CO_2$ by the filter 35 is drawn in by the compressor 34 from the surrounding atmosphere and is injected into the potassium hydroxide present in the anode compartment 4. At the same time, the hydride suspension flows downwards through the cathode compartment 3 with an adjustable speed, in a similar manner to that in the second embodiment according to FIG. 2. The current is collected by means of the discharge electrode 5 and the conductor 36 fixed to the anode body 33. Thus, similarly to the previous embodiment, the available potential difference in this case is that of the hydrogen-oxygen chain.

As opposed to the embodiments described above, the cathodic and anodic metal powder suspensions may also be charged electrochemically in separate charging cells, outside the storage cell, e.g. in a central charging station supplying several cells.

I claim:

1. An electrical energy storage cell comprising a cathode compartment and an anode compartment, an electrolyte in said compartments, a cathode and an anode immersed in said electrolyte, cathodic reactive material as a suspension in the electrolyte and being of particles in the form of a metal hydride which is oxidized to form water during discharge, a cathodic current collector electrode, said particles being in contact with said cathodic current collector electrode, and a porous separating wall, said cathode and anode compartments being separated by said porous separating wall which is permeable to the electrolyte while being impermeable to said reactive material particles and is inert to the electrolyte and to oxidizing and reducing agents.

2. A storage cell according to claim 1, wherein said cathodic reactive material consists of an alloy, in the form of a hydride comprising titanium, nickel and at least one of the group consisting of platinum, palladium, copper, silver, vanadium, zinc and aluminum.

3. A storage cell according to claim 1 comprising an anodic current collector electrode and an anodic reactive material in the form of a suspension, in the electrolyte, of metallic particles consisting substantially of silver, in contact with said anodic current collector electrode.

4. A storage cell according to claim 3, wherein said current collector electrodes are of nickel.

5. A storage cell according to claim 4, comprising a cathodic charge electrode consisting of cadmium and an anodic charge electrode consisting of silver or a silver alloy.

6. A storage cell according to claim 1, wherein in the anode consists of an air or oxygen electrode.

7. A storage cell according to claim 3, comprising at least two containers for respectively storing the charged and the discharged cathodic suspensions and means for conveying said suspensions between said containers, through the cathode compartment, so as to evacuate the discharged cathodic suspension from said compartment to one of said containers and to replace said suspension by a charged cathodic suspension from the other of said containers.

8. A storage cell according to claim 5, comprising two containers and wherein said cathode and anode compartments are each connected to said two containers, the first of said containers being adapted for storing the respective charged suspension and the second of said containers being adapted to receive the respective discharged suspension, and further including means for conveying said suspensions between the respective containers so that, for charging, each discharged suspension flows from the second container, past the respective charge electrode, to the first container and, for discharging, each charged suspension flows, in the opposite direction, from the first container, past the respective current collector electrode, to the second container.

References Cited

UNITED STATES PATENTS 3,409,471 11/1968 Sturm et al. _____ 136—86
3,427,235 2/1969 Le Duc _____ 136—86 XR

FOREIGN PATENTS 1,018,825 2/1966 Great Britain.

WINSTON A. DOUGLAS, Primary Examiner
A. SKAPARS, Assistant Examiner

U.S. Cl. X.R.
136—165